United States Patent [19]

Ikeda et al.

[11] 4,378,099
[45] Mar. 29, 1983

[54] OUTER ESCUTCHEON FIXING STRUCTURE FOR CAR STEREO ETC

[75] Inventors: Tatsuo Ikeda; Shoji Ariga, both of Toda, Japan

[73] Assignee: Clarion Co., Ltd., Tokyo, Japan

[21] Appl. No.: 225,096

[22] Filed: Jan. 14, 1981

[30] Foreign Application Priority Data

Jan. 16, 1980 [JP] Japan ............................... 55-2512[U]

[51] Int. Cl.³ .............................................. G12B 9/00
[52] U.S. Cl. .................................................. 248/27.3
[58] Field of Search ................ 248/27.1, 27.3, DIG. 6

[56] References Cited

U.S. PATENT DOCUMENTS

| | | | |
|---|---|---|---|
| 2,618,998 | 11/1952 | Poupitch | 248/27.3 |
| 2,903,570 | 9/1959 | Worden | 248/27.3 |
| 3,799,483 | 3/1974 | Chiappinelli | 248/27.3 |
| 3,814,928 | 6/1974 | Grosseau | 248/27.3 |
| 4,313,584 | 2/1982 | Fukunaga | 248/27.3 |

FOREIGN PATENT DOCUMENTS 55-140625  4/1980  Japan ................................. 248/27.1

*Primary Examiner*—Francis K. Zugel
*Assistant Examiner*—Michael F. Trettel
*Attorney, Agent, or Firm*—Wallenstein, Wagner, Hattis, Strampel & Aubel

[57] ABSTRACT

An outer escutcheon fixing structure for car stereo etc. which is characterized by channel-shaped fixing members fitted to the front face of an escutcheon body for a car stereo etc. through an instrument panel of a car and horizontal members on an outer escutcheon member defining spaces for receiving tip ends of the respective channel-shaped fixing members. Either the channel-shaped fixing members or the horizontal members are imparted with resiliency in the vertical direction, so that the channel-shaped fixing members are resiliently engaged with the horizontal members to fix the outer escutcheon member.

3 Claims, 3 Drawing Figures

OUTER ESCUTCHEON FIXING STRUCTURE FOR CAR STEREO ETC

BACKGROUND OF THE INVENTION

1. Field of the Invention

This invention generally relates to a fixing structure for an escutcheon portion of a car stereo, car radio, etc., and more particularly to a fixing structure for fitting an outer escutcheon to an instrument panel in front of an escutcheon body.

2. Description of the Prior Art

As widely known, a car stereo or a car radio is mounted in such a manner that openings are formed on an instrument panel of a car so as to correspond to various operating knobs, a cassette tape loading opening and/or a frequency indicator arranged on the front face of escutcheon body of the car stereo or car radio, and the car stereo or car radio is fitted in the openings from the interior of the instrument panel. Thereafter, an outer escutcheon is fitted from the outside of the instrument panel to conceal edges of the openings and setting screws for improving the appearance of the car stereo or radio. Since the outer escutcheon is employed to improve the appearance of the car stereo or radio, it is desirable to avoid employment screws or nails for fitting the outer escutcheon. By this reason, in general, a fixing member is provided on the escutcheon body side for allowing the outer escutcheon to engage therewith. The Assignee of the present invention has proposed, for example, in Japanese UM Publication No. 51-26005 (1976), an outer escutcheon fixing method in which a channel-shaped fixing member having horizontal engaging tip ends each formed with a slit is used as the fixing member and the outer escutcheon has a hole slightly smaller than the horizontal engaging ends of the channel-shaped fixing members and corresponding to the channel-shaped member, so as to fix the outer escutcheon through resilient engagement effected by the slits of the horizontal fixing members. However, since the resiliency is exerted by the slits formed on the fixing members in this conventional fixing structure, the horizontal engaging portion must have a length sufficient to provide the aforesaid effect and the thickness of the outer escutcheon must be large accordingly. In this connection, it is to be noted that the outer escutcheon is preferably flat to eliminate possible injury due to a traffic accident, but the conventional structure cannot satisfy this requirement. In addition, when there are variances in widths of the horizontal engaging portions, the side portions of the horizontal engaging portion made of metal sheet are possibly subject to a large force and deformed thereby. This prevents firm engagement and fixing of the outer escutcheon.

SUMMARY OF THE INVENTION

It is therefore an object of the present invention to provide an outer escutcheon fixing structure which is capable of obviating the disadvantages involved in the conventional structure.

In accordance with the present invention, there is provided an outer escutcheon fixing structure which comprises:
an escutcheon body for a car stereo etc.;
an instrument panel;
channel-shaped fixing members secured to said escutcheon body through said instrument panel;
an outer escutcheon member; and
horizontal members provided inside of said outer escutcheon member at opposite sideward portions thereof, to define engaging spaces for receiving opposite ends of said channel-shaped fixing members, respectively;
said horizontal members or said channel-shaped members being imparted with resiliency in the vertical direction and resiliently kept in engagement when said channel-shaped fixing members are fitted in said engaging spaces, respectively.

DESCRIPTION OF THE EMBODIMENTS

Figure 1:
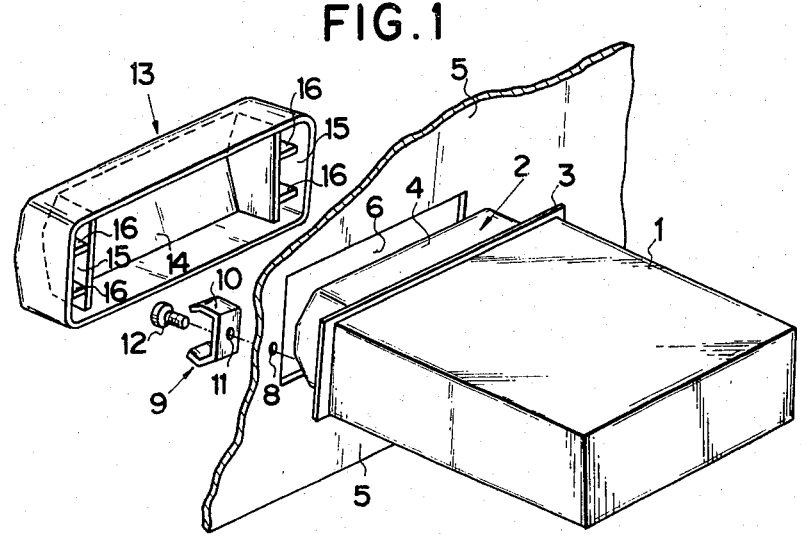
FIG. 1 is an exploded perspective view of an outer escutcheon fixing structure for a car stereo etc. embodying the present invention.

Referring now to the drawings, there are illustrated preferred embodiments of the present invention.

Figure 2:
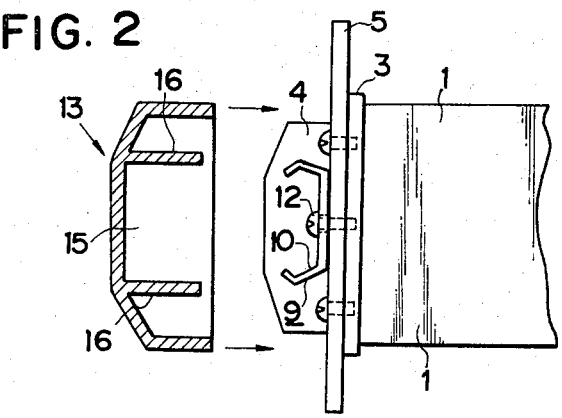
FIG. 2 is a side elevational view of the structure illustrated in FIG. 1, showing an outer escutcheon in section.

FIGS. 1 and 2 illustrate one form of an outer escutcheon fixing structure embodying the present invention. Numeral 1 designates a car stereo or a car radio body. 2 is an escutcheon body formed of a support frame 3 and an operation panel 4. Various operating knobs, a loading opening for a cassette tape and/or a frequency indicator is provided on the operation panel 4. Numeral 5 designates an instrument panel of a car which has an opening 6 for allowing the operation panel 4 to be fitted therein and apertures 8 for receiving setting screws. The car stereo or car radio body 1 is suitably fixed to the instrument panel 5. Numeral 9 designates channel-shaped fixing members each having horizontal engaging portions 10, 10 which is slightly spread outwardly at opposite tip ends thereof and an intermediate vertical portion formed with an aperture 11 as depicted in FIGS. 1 and 2. A screw 12 is fitted loosely through the aperture 11 and the aperture 8 of the instrument panel 5 and screwed into a hole formed on the escutcheon body 3 to secure the channel-shaped fixing member 9 to the escutcheon body 3 through the instrument panel 5. 13 is an outer escutcheon which has a space 14 into which the operation panel 4 is fitted and engaging spaces 15 each defined by upper and lower horizontal members 16. The width of the engaging space 15 in the vertical direction is slightly smaller than the distance between the spread opposite ends of the horizontal engaging portions 10.

To fix the outer escutcheon 13 to the instrument panel 5, the horizontal engaging portions 10, 10 of the respective channel-shaped fixing members 9 are fitted into the engaging spaces 15 of the outer escutcheon 13, respectively, against the resiliency of the horizontal engaging portions 10, 10. Thus, the outer escutcheon 13 is integrally fitted to the escutcheon body 2 to provide an escutcheon for a car stereo or car radio.

Since the outer escutcheon 13 and the channel-shaped fixing members 9 are engaged with each other by the resiliency in the vertical direction as is understandable from the foregoing description, the horizontal engaging portions 10, 10 of the channel-shaped member 9 may have resiliency as in the embodiment illustrated, or lateral ends of each horizontal member 16 of the outer escutcheon may be separated from the outer escutcheon to impart elasticity in the vertical direction to the vertical member. However, since the outer escutcheon 13 is generally made of a resinous material, there is a limitation in elastic displacement of the horizontal member 16. Therefore, it is preferable that the horizontal members 16 be used as horizontal ribs of the outer escutcheon 13 to improve the strength of the outer escutcheon 13 and the channel-shaped fixing members 9 be made of a resilient metal sheet, e.g. phosphor bronze. Alternatively, the fixing members 9 may be made of a resinous material.

Figure 3:
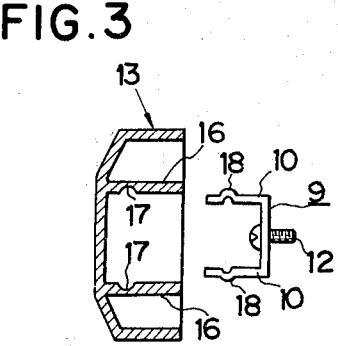
FIG. 3 is a sectional view of main parts of another embodiment of the present invention.

FIG. 3 illustrates another form of an outer escutcheon fixing structure embodying the present invention. The horizontal engaging portions 10, 10 of the channel-shaped fixing member 9 have, at tip end portions thereof, projections 18, 18 and the horizontal members 16 of the outer escutcheon 13 has hollows 17, 17 conformed with and adapted to receive the projections 18, 18, respectively. According to this embodiment, the outer escutcheon 13 is engaged with and fixed to the escutcheon body 2 through the engagement between the projections and the respective hollows and firmly held in the position.

As described above, since the elastic displacement of the fixing member can be larger than that of the conventional arrangement, the thickness of the outer escutcheon can be reduced without causing any problem in effect of fixing the outer escutcheon to the instrument panel. In addition, the structure of the present invention may have various appearances according to necessity. Moreover, the structure of the present invention can surely fix the outer escution in a position, irrespective of possible variances in dimensions of the outer escutcheon etc.

We claim:
1. An outer escutcheon fixing structure which comprises:
 an escutcheon body for a car stereo etc.;
 an instrument panel;
 channel-shaped fixing members secured to said escutcheon body through said instrument panel;
 an outer escutcheon member; and
 horizontal members provided inside of said outer escutcheon member at opposite sideward portions thereof, to define engaging spaces for receiving opposite ends of said channel-shaped fixing members, respectively;
 said horizontal members or said channel-shaped members being imparted with resiliency in the vertical direction and resiliently kept in engagement when said channel-shaped fixing members are fitted in said engaging spaces, respectively.

2. An outer escutcheon fixing structure according to claim 1, wherein each of said channel shaped fixing members is formed of a member made of resilient metal sheet or resinous sheet and bent into a channel-shape and said outer escutcheon is made of a resinous material and has horizontal ribs usable as said horizontal members.

3. An outer escutcheon fixing structure according to claim 1, which further comprises projections provided on the end portions of said channel-shaped fixing members and hollows provided on the respective horizontal members for receiving the projections therein, respectively.

* * * * *